US010929936B1

(12) United States Patent
Duranske (10) Patent No.: US 10,929,936 B1
(45) Date of Patent: Feb. 23, 2021

(54) SYSTEMS AND METHODS TO FACILITATE AUTOMATED VALIDATION OF ANTI-MONEY LAUNDERING ALERTS

(71) Applicant: Jumio Corporation, Palo Alto, CA (US)

(72) Inventor: Benjamin Tyson Duranske, Menlo Park, CA (US)

(73) Assignee: Jumio Corporation, Palo Alto, CA (US)

( * ) Notice: Subject to any disclaimer, the term of this patent is extended or adjusted under 35 U.S.C. 154(b) by 443 days.

(21) Appl. No.: 15/862,148

(22) Filed: Jan. 4, 2018

(51) Int. Cl.
*G06Q 40/00* (2012.01)
*H04L 29/08* (2006.01)
*G06Q 50/00* (2012.01)
*G06Q 50/26* (2012.01)

(52) U.S. Cl.
CPC ......... *G06Q 40/125* (2013.12); *G06Q 50/01* (2013.01); *G06Q 50/26* (2013.01); *H04L 67/306* (2013.01)

(58) Field of Classification Search
CPC ........ G06Q 40/00; G06Q 30/00; G06Q 20/00; G06Q 10/00
USPC ...................................................... 705/3–44
See application file for complete search history.

(56) References Cited

U.S. PATENT DOCUMENTS

| 7,941,370 | B2* | 5/2011 | Paulsen | G06Q 20/02 |
| | | | | 705/1.1 |
| 8,412,605 | B2* | 4/2013 | Griffin | G06Q 20/4016 |
| | | | | 705/35 |
| 8,918,904 | B2* | 12/2014 | Sanin | G06Q 50/01 |
| | | | | 726/28 |
| 9,330,416 | B1* | 5/2016 | Zaslavsky | G06Q 40/12 |
| 9,552,615 | B2 | 1/2017 | Mathura | |
| 9,792,609 | B2* | 10/2017 | Burke | G06Q 20/3224 |
| 9,836,733 | B2* | 12/2017 | Course | G06Q 20/206 |
| 2009/0125369 | A1 | 5/2009 | Kloostra | |
| 2013/0346287 | A1* | 12/2013 | Enzaldo | G06Q 40/02 |
| | | | | 705/38 |
| 2015/0199688 | A1 | 7/2015 | Sulur | |

(Continued)

FOREIGN PATENT DOCUMENTS

WO 2016138183 9/2016

OTHER PUBLICATIONS

Pativat Panurach, "Money in Electronic Commerce: Digital Cash, Electronic Fund Transfer and Ecash", Communication of the ACM, vol. 39, No. 6, June (Year: 1996).*

(Continued)

*Primary Examiner* — Frantzy Poinvil
(74) *Attorney, Agent, or Firm* — Esplin & Associates, PC (57) ABSTRACT

Systems and methods to facilitate automated validation of anti-money laundering alerts are disclosed. Exemplary implementations may: obtain alert information indicating monetary transaction flow patterns suspected as money laundering; identify pattern types of the monetary transaction flow patterns; obtain source lists indicating sources of extra-transactional information related to the entities involved in the monetary transactions and significance of the sources; access the sources and obtain the extra-transactional information; evaluate the extra-transactional information included in the sources in accordance with indicated significance of the sources to validate or disprove the suspicions of the monetary transaction flow patterns; and/or perform other operations.

22 Claims, 3 Drawing Sheets

(56) References Cited

U.S. PATENT DOCUMENTS

| | | | |
|---|---|---|---|
| 2016/0132886 A1* | 5/2016 | Burke | G06Q 20/3224 |
| | | | 705/44 |
| 2016/0155126 A1* | 6/2016 | D'Uva | G06Q 20/40145 |
| | | | 705/44 |
| 2016/0300226 A1* | 10/2016 | Novac | G06Q 20/023 |
| 2018/0082275 A1* | 3/2018 | Course | G07F 17/42 |
| 2018/0121975 A1* | 5/2018 | Weinflash | G06Q 40/02 |
| 2019/0164164 A1* | 5/2019 | Karambakkam | G06K 9/6218 |

OTHER PUBLICATIONS

Summers et al., Emergence of immediate funds transfer as a general-purpose means of payment, Federal Reserve Bank of Chicago (Year: 2011).*

* cited by examiner

FIG. 3 ample # SYSTEMS AND METHODS TO FACILITATE AUTOMATED VALIDATION OF ANTI-MONEY LAUNDERING ALERTS

FIELD OF THE DISCLOSURE

The present disclosure relates to systems and methods to facilitate automated validation of anti-money laundering alerts.

BACKGROUND

Money laundering may involve activities intended to conceal a source of illegally gotten money. Banks, financial institutes, monitoring agencies, and/or other entities may monitor monetary transaction and/or other activities to determine if money laundering is occurring. Such monitoring may be part of anti-money laundering (AML) programs required by the government. For example, many AML laws, rules, and orders are in place pursuant to policies established by the Securities and Exchange Commission (SEC). These monitoring programs will issue alerts if its determined that one or more monetary transactions appear suspicious.

SUMMARY

Aspects of the present disclosure relates to systems and methods configured to facilitate automated validation of anti-money laundering alerts. Anti-money laundering (AML) alerts may be obtained from one or more entities that monitor monetary transactions and generate the alerts. By way of non-limiting illustration, alerts may be obtained from a transaction monitoring system and/or other systems included in banks, financial institutes, monitoring agencies, and/or other entities that generates AML alerts. The alerts may convey suspicions that one or more monetary transactions appear as money laundering. One or more implementations of the systems and methods presented herein may be directed to validating and/or disproving these suspicions by evaluating extra-transactional information, e.g., information about the entities involved in the monetary transactions but not necessary information about the transactions themselves. In particular, the extra-transactional information may include publicly available information which may be ranked based on significance of that information in its use to validate and/or disprove the suspicions.

The system may include one or more processors configured by machine-readable instructions. The machine-readable instructions may include one or more computer program components. The one or more computer program components may include one or more of an alert component, a pattern type component, a source list component, a source accessing component, an evaluation component, and/or other components.

The alert component may be configured to obtain alert information and/or other information. The alert information may include alerts indicating one or more of monetary transaction flow patterns suspected as money laundering, entities involved in monetary transactions that contribute to the monetary transaction flow patterns, and/or other information.

The pattern type component may be configured to identify pattern types of the monetary transaction flow patterns.

The source list component may be configured to obtain source lists indicating sources of extra-transactional information. An individual source list may be specific to an individual pattern type. The extra-transactional information may include information about the entities involved in the monetary transactions. An individual source list may further indicate significance of the individual sources included in the individual source list.

The source accessing component may be configured to access the sources and/or obtain the extra-transactional information in the sources that may be related to the entities involved in the monetary transactions.

The evaluation component may be configured to evaluate the extra-transactional information included in the sources in accordance with the indicated significance of the sources. The evaluation may facilitate validating or disproving the suspicions of the monetary transaction flow patterns indicated in the alerts. The indicated significance of the sources may convey weights applied to the sources in determining whether to validate or disprove of the suspicions.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
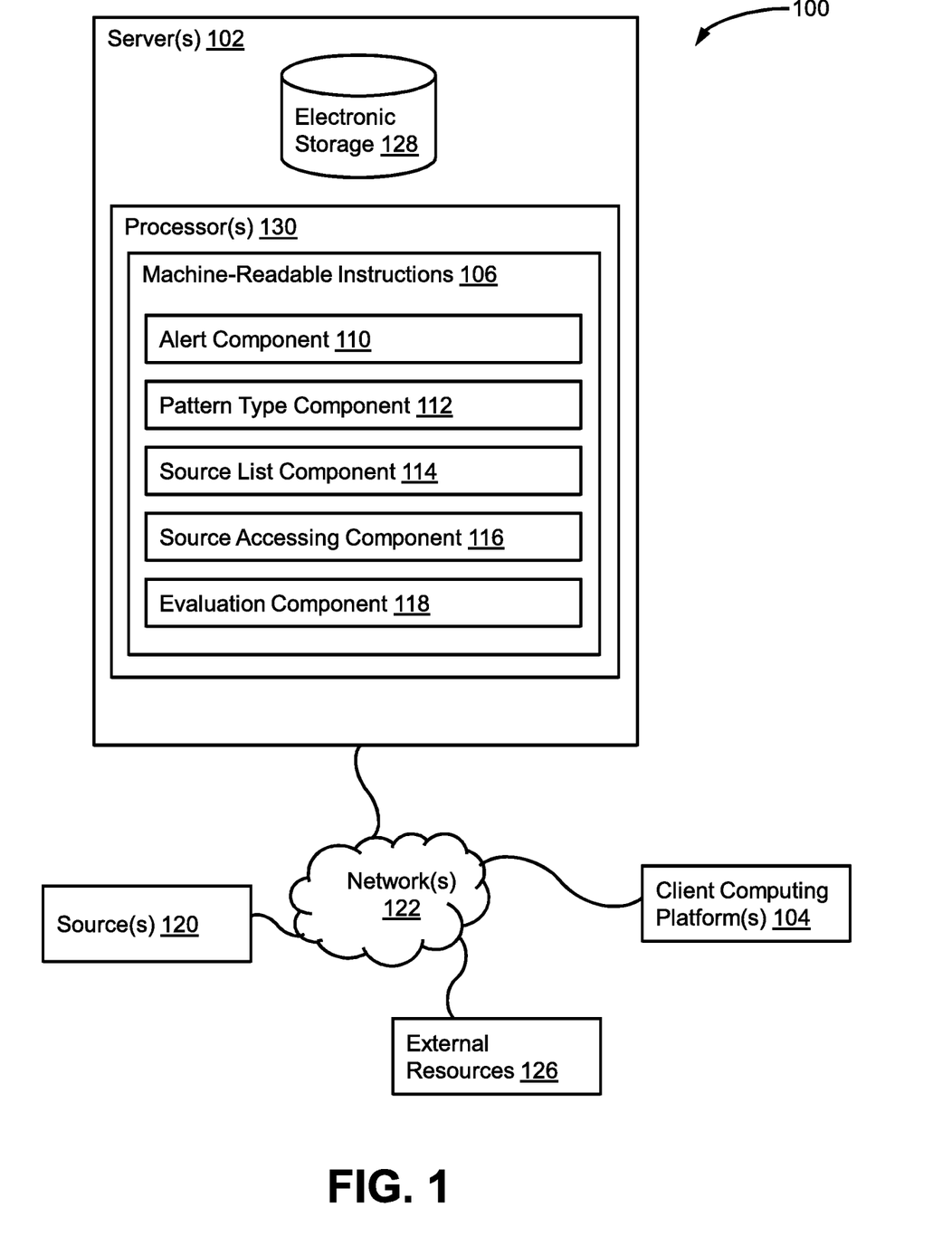
FIG. 1 illustrates a system configured to facilitate automated validation of anti-money laundering alerts, in accordance with one or more implementations.

FIG. 1 illustrates a system 100 configured to facilitate automated validation of anti-money laundering alerts, in accordance with one or more implementations. Anti-money laundering (AML) alerts may be obtained from a transaction monitoring system and/or other systems included in banks, financial institutes, monitoring agencies, and/or other entities that generate the AML alerts. The alerts may convey suspicions that one or more monetary transactions appear as money laundering. One or more implementations of the systems and methods presented herein may be directed to validating and/or disproving these suspicions by evaluating extra-transactional information and/or other information.

In some implementations, system 100 may include one or more of one or more servers 102, one or more client computing platforms 104, one or more sources 120, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. Communications may be facilitated through network(s) 122. The network(s) 122 may include wired and/or wireless connections. The network(s) 122 may include the Internet, and/or other communication networks. It will be appreciated that this is not intended to be limiting and that the scope of this disclosure includes implementations in which components of system 100 may be operatively linked via some other communication media.

Server(s) 102 may include one or more physical processor 130 configured by machine-readable instructions 106. Executing the machine-readable instructions 106 may cause one or more physical processors 130 of server(s) 102 to facilitate automated validation of anti-money laundering alerts. Machine-readable instructions 106 may include one or more computer program components. The computer program components may include one or more of an alert component 110, a pattern type component 112, a source list component 114, a source accessing component 116, an evaluation component 118, and/or other computer program components.

Alert component 110 may be configured to obtain alert information and/or other information. The alert information may include alerts and/or other information. The alerts may indicate one or more of monetary transaction flow patterns suspected as money laundering, identifications of entities involved in monetary transactions that contribute to the monetary transaction flow patterns, and/or other information. The alerts may include anti-money laundering alerts, or "AML" alerts. Money laundering may refer to money concealment. Money laundering may include concealing the source of illegally gotten money, according to some implementations.

The entities involved in monetary transaction may include one or more of a beneficiary of a monetary transaction, a sender of a monetary transaction, an intermediary in a monetary transaction, and/or other entities that may be involved in monetary transactions. An entity may be one or more of a corporate entity, an individual (e.g., a person), a group of people, and/or other entities.

By way of non-limiting illustration, alert component 110 may be configured to obtain alert information including one or more of a first alert indicating a first monetary transaction flow pattern suspected as money laundering, identification of a first entity and/or other entities involved in one or more monetary transactions that contribute to the first monetary transaction flow pattern, and/or other information.

Pattern type component 112 may be configured to identify pattern types of the monetary transaction flow patterns indicated in the alerts. The pattern types may refer to techniques in which entities may act to conceal the source of illegally gotten money. The pattern types may be determined based on the alert information and/or other information. By way of non-limiting illustration, the pattern types may be determined based on matching the monetary transactions that contribute to the monetary transaction flow patterns to the type of transactions associated with individual pattern types. In some implementations, the alert information may indicate the pattern types, e.g., the pattern types may be indicated in the received AML alerts.

In some implementations, the pattern types may include one or more of a many-to-one type, a receiving velocity type, a low chargeback type, a sales volume mismatch type, and/or other types.

The many-to-one type monetary transaction flow pattern may refer to money laundering cases where individual transactions and/or series of transactions have one or more common points of origin and a common beneficiary. For example, multiple common points of origin may be sending money to a common beneficiary. The multiple common points of origin may be acting in concert to conceal the illegal nature of money being sent to the common beneficiary. The common point of origin may refer to one or more of region of origin, an originating financial account, an originating institution, and/or other point of origin. The region may be a location. The region may include the extended spatial location, according to some implementations.

The receiving velocity type monetary transaction flow pattern may refer to cases where a velocity of money received by an entity meets and/or exceeds a threshold. This may mean the entity has more incoming money than may be typically expected. In some implementations, the threshold may be relative to one or more of the business or industry the receiving entity is involved in, the location of the entity, and/or other information. The velocity of money received by an entity may include a rate at which the money is received by the entity. In some implementations, the velocity of money received by an entity may be relative to a period of time. In some implementations, the period of time may be one or more of one day, multiple days, one week, multiple weeks, one month, multiple months, one year, multiple year, and/or other periods of time.

The low chargeback type monetary transaction flow pattern may refer to cases where a demand by a credit-card provider for an entity to make good the loss on a fraudulent or disputed transaction meets and/or falls below a threshold. Chargebacks may be typical in conventional, legal businesses. If there the chargebacks are relatively low (compared to threshold), this may cause suspicion because it shows that substantial amount of transaction are occurring without any issue, which may not be common. In some implementations, the threshold may be relative to one or more of the business or industry the entity is involved in, the location of the entity, and/or other information. In some implementations, an evaluation of the chargeback may be relative to a period of time. In some implementations, the period of time may be one or more of one day, multiple days, one week, multiple weeks, one month, multiple months, one year, multiple year, and/or other periods of time.

The sales volume mismatch type monetary transaction flow pattern may refer to cases where an asserted volume of sales by an entity does not meet, or substantially match, a social and/or economic profile for that entity. This may cause suspicion because the entity may be reporting more sales (e.g., fraudulent sales) than are actually occurring. A social profile may be derived from sources of social information, described in more detail herein. An economic profile may be derived from other public sources that may provide economic insight for the entity. For example, the other public sources where an economic profile may be derived for the entity may include public earnings and sales reports, and/or other sources.

It is noted that the above examples of pattern types of monetary transaction flow patterns that causes suspicion of money laundering is for illustrative purposes and not to be considered limiting. For example, other patterns and/or techniques in which entities may act to conceal the source of illegally gotten money are contemplated within the scope of this disclosure.

By way of non-limiting illustration, pattern type component 112 may be configured to identify a first pattern type of the first monetary transaction flow pattern of the first alert.

Source list component 114 may be configured to obtain source lists indicating sets of sources included in one or more sources 120. The one or more sources 120 may be sources of extra-transactional information and/or other information. The extra-transactional information may include information about the one or more entities involved in monetary transactions. The extra-transactional information may include publicly available information. The extra-transactional information may include information about the one or more entities involved in monetary transactions that may be different from information about the transactions themselves. By way of non-limiting illustration, information about the transactions themselves may be private information (e.g., bank information) and the extra-transactional information may be public information and/or other information.

The sources in the source lists may be used to evaluate the suspicions of the monetary transaction flow patterns to determine whether those suspicions are warranted. For example, evaluation of individual sources may facilitate validating and/or disproving such suspicions. For example, it may be possible that an alert indicating a suspicious monetary transaction flow pattern was a "false alarm." That is, an entity may have engaged in activities that appear to be money laundering which causes a generation of an alert. However, it may be possible that the entity was merely engaging in legal activities that happened to follow a monetary transaction flow pattern that raises suspicions of money laundering and/or other fraud. The evaluation of extra-transactional information may provide a technique to validate or disprove the suspicions using information that may not be directly tied to the transactions that contributed to that suspicious patterns.

An individual source list may be specific to one or more pattern types. An individual source list may be specific to an individual pattern type. For example, a source list may include a compilation of sources determined to provide the best insight as to validate or disprove an alert conveying a particular type of monetary transaction flow pattern. By way of non-limiting illustration, the first pattern type may be associated with a first source list, a second pattern type may be associated with a second source list, and/or other pattern types may be associated with other source lists.

In some implementations, different source lists may have one or more sources that are common between them. In some implementations, different source lists may include different sources. In some implementations, a source list may include at least one source that may not be included in another source list. Once a pattern type is determined, an source list specific to that pattern type may be obtained and extra-transactional information and/or other information included in the sources of the source list may be accessed and evaluated to validate or disprove a suspicion.

In some implementations, an individual source list may indicate significance of the individual sources included in the individual source list. The significance may be an importance of the information as it relates to determining whether or not extra-transactional information of the source may be indicative of money laundering (see, e.g., evaluation component 118). For example, individual sources in an individual source list may be ranked based on order of significance. The evaluation of extra-transactional information within individual sources may be weighted based on respective position in the rank. Examples of the significance may include one or more of consequence of that information as its related to validating and/or disproving suspicions, historicalness of that information as its related to validating and/or disproving suspicions, meaningfulness of that information as its related to validating and/or disproving suspicions, and/or other significances as it relates to determining whether or not extra-transactional information may be indicative of money laundering.

In some implementations, individual source lists may further indicate, for individual sources in the individual source list, significance of types of extra-transactional information included in the individual sources. For example, individual sources may include one or more types of extra-transactional information about an entity. Accordingly, in some implementations, not only may the sources within a source list be ranked, but the types of information included within individual sources may be rank based on the type's respective significance.

In some implementations, individual source lists may further indicate, for individual sources in the individual source list, significance of individual extra-transactional information included in the individual sources. The significant of individual extra-transactions information may be independent of the type of the extra-transactional information and/or may be in accordance with the ranking of the type. Accordingly, in some implementations, not only may the sources within a source list be ranked and/or the types of extra-transactional information within individual sources be ranked, but the extra-transactional information itself included within individual sources may be rank based on respective significance.

Figure 3:
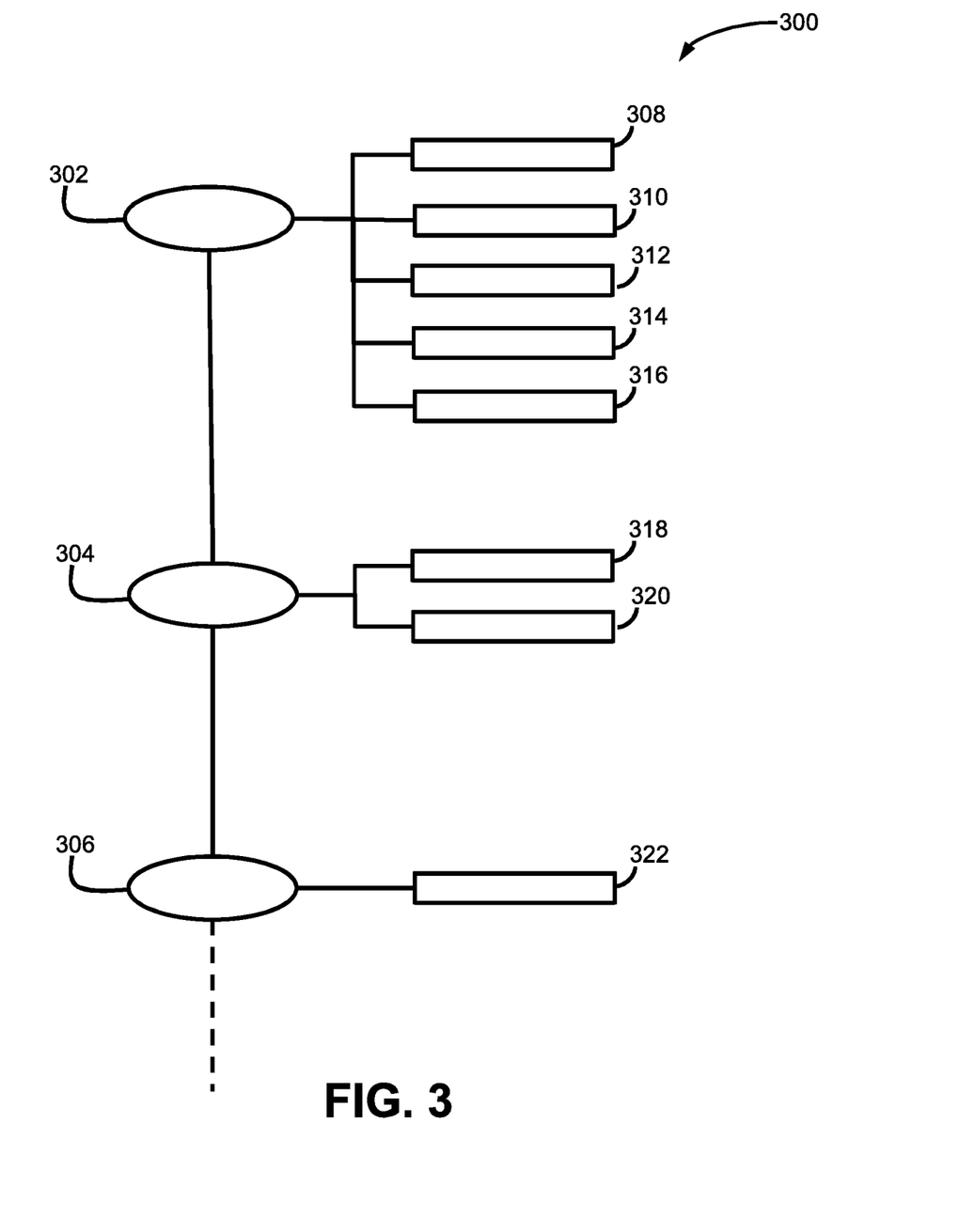
FIG. 3 shows a graphical illustration of a source list, illustrating one or more of sources ranked by significance, types of extra-transactional information within individual sources ranked by significance, and/or the extra-transactional information within the individual sources ranked by significance.

FIG. 3 illustrates a graphical illustration of a source list 300. The source list 300 illustrating one or more of sources ranked by significance, types of extra-transactional information within individual sources ranked by significance, and/or the extra-transactional information within the individual sources ranked by significance. The rank is graphically shown in a descending order from the top of the page toward the bottom where a higher position represents a relatively higher rank and/or higher significance, and the lower position represents a relatively lower rank and/or a lower significance.

By way of non-limiting illustration, the first column (e.g., the ovals) may represent sources ranked by significance. The sources may include one or more of a first source 302, a second source 304, a third source 306, and/or other sources. The first source 302 may be more significant than second source 304, second source 304 may be more significant than third source 306, and so on. The second column (e.g., the rectangles) may represent how types of extra-transactional information within the sources and/or the extra-transactional information within the sources may be ranked by significance. In some implementations, elements 308-316 may represent types of extra-transactional information within first source 302 ranked by significance. In some implementations, elements 308-316 may represent the extra-transactional information within first source 302 ranked by significance. In some implementations, elements 318 and 320 may represent types of extra-transactional information within second source 304 ranked by significance. In some implementations, element 322 may represent a type of extra-transactional information within third source 306 determined as being significant. In some implementations, element 322 may represent extra-transactional information within third source 306 determined as being significant.

Returning to FIG. 1, in some implementations, one or more sources 120 may include one or more of a social media source, a customer due diligence source, an employment information source, a credit card information source, a velocity of funds reports source, an earnings and sales reports source, and/or other sources. It is noted that the sources, types of extra-transactional information included within the sources, extra-transactional information included within those types, and/or significances of the sources, types, and extra-transactional information presented herein are for illustrative purposes and not to be considered limiting. It is noted that the sources and/or types of extra-transactional information included therein is provided for illustrative purposes only and is not intended to be limiting. Instead, it is to be understood that other sources of extra-transactional information, other types of extra-transactional information, and/or other extra-transactional information may be contemplated within the scope of this disclosure.

A social media source may include a source of publicly available information. Social media sources may provide insight as to a relationship between a sender and a receiver of a monetary transaction. The social media sources may include one or more of Yelp®, Facebook®, Twitter®, Google® Maps, LinkedIn®, and/or other social media sources. In some implementations, types of extra-transactional information in the social media sources may include one or more of crowd-sourced review information, engagement information, identification information, and/or other information.

The crowd-sourced review information may be related to information gathered from the public's activity with a social media source of an entity. By way of non-limiting illustration, the crowd-resourced review information may include one or more of quantity of reviews, quantity of shares, average review length, average photos per review, distribution of reviews over time, quantity of up-votes, average votes per review, average quantity of reviews done by individual reviewers, quantity of stars, information establishing whether reviewers are real people, quantity of visits, average comments on posts, quantity of followers, quantity of check-ins, and/or other information.

In some implementations, the engagement information may be related to activities of an entity to reach out to, or engage with, the public via a social media source. By way of non-limiting illustration, the engagement information may include one or more of quantity of photos, frequency of posts, information in an about-us page, length of an about-us page, and/or other information.

In some implementations, the identification information may be associated with information that identifies an entity and/or may be specific to an identity of an entity. By way of non-limiting illustration, the identification information may include one or more of age of a social media profile, listed address, listed phone number, listed hours, listed website, business category or company type, company size, price range of products and/or services offered, year founded, specialty offerings, friends or connections with the social media profile, description of work experience, lists of company employees, length of biography on the profile (e.g., an "about us" description), and/or other information.

In some implementations, a customer due diligence source may refer to a source that include publicly available personal information about entities. The types of the extra-transactional information in customer due diligence sources may include one or more of beneficiary information, point-of-origin information, driver's license information, criminal background information, and/or other information. A customer due diligence source may include one or more of libraries, DMV records, court records, websites (e.g., commercial, business, and/or personal), Business directories, regulatory filings, and/or other sources.

The beneficiary information may be information about an entity who receives money in a monetary transaction. The information about a beneficiary may include information that identifies an entity and/or information that may be specific to an identity of an entity. By way of non-limiting example, the beneficiary information may include one or more of entity location (e.g., location of primary place of business), age of the entity (e.g., age of business), business status (e.g., one or more of LLC, partnership, corporation, LLP, and/or other status), region, industry, length of relationship to point-of-origin of a monetary transaction that benefits the beneficiary, financial status (e.g., one or more of debt, credit rating, and/or other status), and/or other information. An industry may be a commercial enterprise. The industry may include the people or companies engaged in a particular kind of commercial enterprise, according to some implementations. Examples of the industry may include one or more of aluminum business, apparel industry, automobile industry, aviation, banking industry, chemical industry, coal industry, computer industry, construction industry, electronics industry, entertainment industry, film industry, growth industry, lighting industry, market, munitions industry, oil industry, plastics industry, service industry, shipbuilding industry, shoe industry, sign industry, steel industry, tobacco industry, toy industry, trucking industry, and/or other industries.

The point-of-origin information may be information about a sending entity in a monetary transaction. The information about a sender may include information that identifies an entity and/or may be specific to an identity of an entity. By way of non-limiting example, the point-of-origin information may include one or more of location, business status, region, industry, age of the entity (e.g., age of business), and/or other information.

The driver's license information may be associated with driver's license and/or other public driving records of an entity. By way of non-limiting illustration, the driver's license information may include one or more of a driver's license number, a state of issuance, a status of license (e.g., issued, pending, revoked, and/or other status), and/or other information.

The criminal background information may include publicly available criminal information about an entity involved in a monetary transaction. The criminal background information may include information about past involvement in high money laundering crimes and/or other crimes. By way of non-limiting example, the crimes may include one or more of drug involvement, terrorism involvement, gang involvement, and/or other crimes that may be tied to money laundering.

An employment information source may include public information about an entity's past and/or current employment. The types of the extra-transactional information in an employment information source may include one or more of salary information, current employer information, length of current employment information, past employer information, length of past employment information, and/or other information. An employment information source may include one or more of libraries, websites (e.g., commercial, business, and/or personal), professional licensing records, regulatory filings, and/or other sources.

The salary information may include salary of an entity. The current employer information may include one or more of a name of a current employer, an industry of a current employer, and/or other information. The length of current employment information may include a length of a current employment. The past employer information may include one or more of a name of a past employer, an industry of a past employer, and/or other information. The length of past employment information may include a length of a past employment.

A credit card information source may include a source of publicly available credit and/or credit history information. In some implementations, a type of the extra-transactional information in a credit card information source may include transaction history information and/or other information. By way of non-limiting example, the transaction history information may include one or more of quantity of transactions, quantity of chargebacks, average quantity of chargebacks for an individual business (e.g., a similar business to a business of an entity indicated in an alert), size of the individual business, industry of the individual business, age of the individual business, and/or other information. The credit card information source may include one or more of transactional data databases, risk databases and/or other sources.

A velocity of funds reports source may include sources of publicly available information related to purported funds of an entity. In some implementations, a type of the extra-transactional information in a velocity of funds report source may include velocity of funds information and/or other information. The velocity of funds information may include a velocity of funds report and/or other information. The velocity of funds reports source may include one or more of the entity themselves, a public reporting entity, a risk database, and/or other sources.

An earnings and sales reports source may include a source of publicly available information related to purported earnings, sales, and/or other figures related to a business of an entity. In some implementations, a type of the extra-transactional information in an earnings and sales reports source may include earnings and sales information and/or other information. The earnings and sales information may include an earnings and sales report and/or other information. The earnings and sales reports source may include one or more of the entity themselves, a public reporting entity, business databases (e.g., databases providing estimates such as TechCrunch®), news databases and/or other sources.

In some implementations, a source list specific to the many-to-one type monetary transaction flow pattern may include one or more of social media sources, customer due diligence sources, employment information sources, and/or other sources. In some implementations, the source list specific to the many-to-one type monetary transaction flow pattern may specify significance of the sources in the source list. In some implementations, the source list specific to the many-to-one type monetary transaction flow pattern may specify that the customer due diligence sources may be more significant than employment information sources, and/or that employment information sources may be more significant than the social media sources.

In some implementations, the source list specific to the many-to-one type monetary transaction flow pattern may specify significance of the types of extra-transactional information included in the individual sources and/or significance of the extra-transactional information itself.

For the customer due diligence sources, the source list specific to the many-to-one type monetary transaction flow pattern may specify significance of types of extra-transactional information in the customer due diligence sources. By way of non-limiting illustration, the source list may specify that the beneficiary information may be more significant than the point-of-origin information, the point-of-origin information may be more significant than the driver's license information, and/or the driver's license information may be more significant than the criminal background information.

For the beneficiary information specific to the many-to-one type monetary transaction flow pattern, the location may be more significant than the business status, the business status may be more significant than the business region, the business regions may be more significant than the industry, the industry may be more significant than the length of relationship to a point-of-origin, and/or the length of relationship to a point-of-origin may be more significant than the financial status.

For the point-of-origin information specific to the many-to-one type monetary transaction flow pattern, the location may be more significant than the business status, the business status may be more significant than the business region, and/or the business region may be more significant than the industry.

For employment information sources, the source list specific to the many-to-one type monetary transaction flow pattern may specify significance of the types of extra-transactional information included in those sources. For example, the source list may specify that the salary information may be more significant than current employer information, the current employer information may be more significant than length of current employment information, the length of current employment may be more significant than past employer information, and/or the past employer information may be more significant than length of past employment information.

For social media sources, the source list specific to the many-to-one type monetary transaction flow pattern may specify one or more of Facebook® as a social media source, LinkedIn® as a social media source, and/or other sources. The source list specific to the many-to-one type monetary transaction flow pattern may specify one or more of significance of the different social media sources, significance of the types of extra-transactional information in the social media sources, and/or significance of the extra-transactional information. By way of non-limiting illustration, the source list specific to the many-to-one type monetary transaction flow pattern may specify that Facebook® may be more significant than LinkedIn®.

For types of extra-transactional information included in social media sources, the source list specific to the many-to-one type monetary transaction flow pattern may specify that identification information may be most significant. For the identification information included in Facebook®, the source list specific to the many-to-one type monetary transaction flow pattern may specify that description of work experience and/or friends or connections within the social media profile may be significant. The source list may specify that the description of work experience may be more significant than friends or connections with the social media profile on Facebook®. For the identification information included in LinkedIn®, the source list specific to the many-to-one type monetary transaction flow pattern may specify that description of work experience and/or listing of company employees may be significant. The source list may specify that listing of company employees may be more significant than the description of work experience.

In some implementations, a source list specific to the receiving velocity type monetary transaction flow pattern type may include one or more of credit card information sources, customer due diligence sources, velocity of funds reports sources, social media sources, and/or other sources. In some implementations, the source list specific to the receiving velocity type monetary transaction flow pattern may specify significance of the sources in the source list. In some implementations, the source list specific to the receiving velocity type monetary transaction flow pattern may specify that the credit card information sources may be more significant than the customer due diligence sources, the customer due diligence sources may be more significant than the velocity of funds reports sources, and/or the velocity of funds report sources may be more significant than the social media sources.

In some implementations, the source list specific to the receiving velocity type monetary transaction flow pattern may specify the types of extra-transactional information that may be significant, the significance of the types of extra-transactional information included in the individual sources, and/or significance of the different extra-transactional information.

For the credit card information sources, the source list specific to the receiving velocity type monetary transaction flow pattern may specify that the quantity of transactions may be most significant.

For the customer due diligence sources, the source list specific to the receiving velocity type monetary transaction flow pattern may specify that beneficiary information and driver's license information may be significant. For the beneficiary information, the source list may specify that age of the entity and/or the industry may be significant. The source list specific to the receiving velocity type monetary transaction flow pattern may specify that the beneficiary information may be more significant than driver's license information. For the beneficiary information, the source list may specify that the age of the entity may be more significant than the industry.

For social media sources, the source list specific to the receiving velocity type monetary transaction flow pattern may specify one or more of Yelp® as a social media source, Facebook® as a social media source, Twitter® as a social media source, Google® Maps as a social media source, LinkedIn® as a social media source, and/or other sources. The source list specific to the receiving velocity type monetary transaction flow pattern may specify one or more of significance of the different social media sources, significance of the types of extra-transactional information in the social media sources, and/or significance of the extra-transactional information. By way of non-limiting illustration, the source list specific to the receiving velocity type monetary transaction flow pattern may specify that Yelp® may be more significant than Facebook®, Facebook® may be more significant than Twitter®, Twitter® may be more significant than Google® Maps, and/or Google® Maps may be more significant than LinkedIn®.

For extra-transactional information included in Yelp®, the source list specific to the receiving velocity type monetary transaction flow pattern may specify one or more of: quantity of reviews may be more significant than average review length, average review length may be more significant than quantity of photos, quantity of photos may be more significant than average photos per review, average photos per review may be more significant than age of profile, age of profile may be more significant than distribution of reviews over time, distribution of reviews over time may be more significant than quantity of stars, quantity of stars may be more significant than identification information, the identification information may be more significant than average votes per review, average votes per review may be more significant than average quantity of reviews done by individual reviewers, and/or average quantity of reviews done by individual reviewers may be more significant than quantity of check-ins.

For extra-transactional information included in Facebook®, the source list specific to the receiving velocity type monetary transaction flow pattern may specify one or more of: quantity of reviews may be more significant than average review length, average review length may be more significant than quantity of photos, quantity of photos may be more significant than quantity of likes (and/or followers and/or visits), quantity of likes (and/or followers and/or visits) may be more significant than identification information (including one or more of address, phone number, website, hours, business category, and/or price range), the identification information may be more significant than information establishing whether reviewers are real people, information establishing whether reviewers are real people may be more significant than average likes on posts (and/or comments on posts), the average likes on posts (and/or comments on posts) may be more significant than frequency of posts, and/or the frequency of posts may be more significant than age of profile.

For extra-transactional information included in Twitter®, the source list specific to the receiving velocity type monetary transaction flow pattern may specify one or more of: age of profile may be more significant than quantity of tweets, quantity of tweets may be more significant than quantity of retweets, and/or quantity of retweets may be more significant than quantity of likes.

For extra-transactional information included in Google® Maps, the source list specific to the receiving velocity type monetary transaction flow pattern may specify one or more of: listed hours may be more significant than listed address, listed address may be more significant than listed phone number, listed phone number may be more significant than a listed website link, listed website may be more significant than quantity of reviews, quantity of reviews may be more significant than average quantity of ratings, average quantity of rantings may be more significant than quantity of photos, and/or quantity of photos may be more significant than average length of reviews.

For extra-transactional information included in LinkedIn®, the source list specific to the receiving velocity type monetary transaction flow pattern may specify one or more of: length of biography may be more significant than a listed website, the listed website may be more significant than a listed location, listed location may be more significant than year founded, year founded may be more significant than company type, company type may be more significant than company size, company size may be more significant than specialty offerings, specialty offerings may be more significant than posted job offerings, posted job offerings may be more significant than new hires per month, new hires per month may be more significant than total job openings posted, and/or total job opening posted may be more significant than average employee tenure.

In some implementations, a source list specific to the low chargeback type monetary transaction flow pattern type may include one or more of credit card information sources, earnings and sales reports sources, and/or other sources. In some implementations, the source list specific to the low chargeback type monetary transaction flow pattern may specify significance of the sources in the source list. In some implementations, the source list specific to the low chargeback type monetary transaction flow pattern may specify that the credit card information sources may be more significant than the earnings and sales reports sources.

In some implementations, the source list specific to the low chargeback type monetary transaction flow pattern may specify the types of extra-transactional information that may be significant, the significance of the types of extra-transactional information included in the individual sources, and/or significance of the different extra-transactional information.

For the credit card information sources, the source list specific to the low chargeback type monetary transaction flow pattern may specify that quantity of transactions, quantity of chargebacks, and/or average quantity of chargebacks for a similar business may be significant. The source list may specify significance of the extra-transactional information. By way of non-limiting illustration, the source list may specify that quantity of transactions may be more significant than the quantity of chargebacks, and/or that the quantity of chargebacks may be more significant than the average quantity of chargebacks for a similar business.

For the earnings and sales reports sources, the source list specific to the low chargeback type monetary transaction flow pattern may specify that earnings and sales reports may be significant. In some implementations, the earnings and sales reports included in the earnings and sales reports sources may be the only significant extra-transactional information.

In some implementations, a source list specific to the sales volume mismatch type monetary transaction flow pattern type may include one or more of earnings and sales reports sources, social media sources, and/or other sources. In some implementations, the source list specific to the sales volume mismatch type monetary transaction flow pattern may specify significance of the sources in the source list. In some implementations, the source list specific to the sales volume mismatch type monetary transaction flow pattern may specify that the earnings and sales reports sources may be more significant than the social media sources.

In some implementations, the source list specific to the sales volume mismatch type monetary transaction flow pattern may specify the types of extra-transactional information that may be significant, the significance of the types of extra-transactional information included in the individual sources, and/or significance of the different extra-transactional information.

For the earnings and sales reports sources, the source list specific to the sales volume mismatch type monetary transaction flow pattern may specify that earnings and sales reports may be significant. In some implementations, the earnings and sales reports included in the earnings and sales reports sources may be the only significant extra-transactional information.

For social media sources, the source list specific to the sales volume mismatch type monetary transaction flow pattern may specify one or more of Yelp® as a social media source, Facebook® as a social media source, Twitter® as a social media source, Google® Maps as a social media source, LinkedIn® as a social media source, and/or other sources. The source list specific to the sales volume mismatch type monetary transaction flow pattern may specify one or more of significance of the different social media sources, significance of the types of extra-transactional information in the social media sources, and/or significance of the extra-transactional information. By way of non-limiting illustration, the source list specific to the sales volume mismatch type monetary transaction flow pattern may specify that Yelp® may be more significant than Facebook®, Facebook® may be more significant than Twitter®, Twitter® may be more significant than Google® Maps, and/or Google® Maps may be more significant than LinkedIn®.

For extra-transactional information included in Yelp®, the source list specific to the receiving velocity type monetary transaction flow pattern may specify one or more of: quantity of reviews may be more significant than average review length, average review length may be more significant than quantity of photos, quantity of photos may be more significant than average photos per review, average photos per review may be more significant than age of profile, age of profile may be more significant than distribution of reviews over time, distribution of reviews over time may be more significant than quantity of stars (or other rating), quantity of stars may be more significant than identification information (e.g., address, phone number, website, hours, etc.), the identification information may be more significant than average votes per review, average votes per review may be more significant than average quantity of reviews done by individual reviewers, and/or average quantity of reviews done by individual reviewers may be more significant than quantity of check-ins.

For extra-transactional information included in Facebook®, the source list specific to the receiving velocity type monetary transaction flow pattern may specify one or more of: quantity of reviews may be more significant than average review length, average review length may be more significant than quantity of photos, quantity of photos may be more significant than quantity of likes (and/or followers and/or visits), quantity of likes (and/or followers and/or visits) may be more significant than identification information (including one or more of address, phone number, website, hours, business category, and/or price range), the identification information may be more significant than information establishing whether reviewers are real people, information establishing whether reviewers are real people may be more significant than average likes on posts (and/or comments on posts), the average likes on posts (and/or comments on posts) may be more significant than frequency of posts, and/or the frequency of posts may be more significant than age of profile.

For extra-transactional information included in Twitter®, the source list specific to the receiving velocity type monetary transaction flow pattern may specify one or more of: age of profile may be more significant than quantity of tweets, and/or quantity of tweets may be more significant than engagement information (e.g., quantity of retweets, comments, and/or likes).

For extra-transactional information included in Google® Maps, the source list specific to the receiving velocity type monetary transaction flow pattern may specify one or more of: listed hours may be more significant than listed address, listed address may be more significant than listed phone number, listed phone number may be more significant than listed website, listed website may be more significant than quantity of review, quantity of reviews may be more significant than average rating, average rating may be more significant than a quantity of photos, and/or quantity of photos may be more significant than average length of reviews.

For extra-transactional information included in LinkedIn®, the source list specific to the receiving velocity type monetary transaction flow pattern may specify identification information may be most significant. In some implementations, length of biography on the profile (e.g., an "about us" description) may be more significant than listed website, listed website may be more significant than listed address, listed address may be more significant than year founded, year founded may be more significant than company size, company size may be more significant than specialty offerings, specialty offerings may be more significant than job postings, job postings may be more significant than quantity of new hires by month, quantity of new hires by month may be more significant than total job openings, and/or total job openings may be more significant than average employee tenure.

Source accessing component 116 may be configured to access the sources of one or more sources 120 and obtain the extra-transactional information in the sources related to one or more entities involved in monetary transactions contributing to the monetary transaction flow patterns. Source(s) 120 may be accessed and/or extra-transactional information may be obtained over network(s) 122, such as the internet. By way of non-limiting illustration, responsive to obtaining the first source list, source accessing component 116 may be configured to access sources of the first source list are accessed to obtain extra-transactional information about the first entity.

Evaluation component 118 may be configured to evaluate the extra-transactional information included in the sources in accordance with the indicated significance of the sources. The indicated significance of the sources may convey weights applied to the sources in determining whether to validate or disprove of the suspicions. The evaluation may be directed to validating or disproving the suspicions of the monetary transaction flow patterns indicated in the alerts. Evaluating the extra-transactional information included in the sources may be further in accordance with one or more of the indicated significance of the types of extra-transactional information included in the individual sources, the indicated significance of the extra-transactional information included in the individual sources, and/or other information. The indicated significance of the sources may convey weights applied to the sources in determining whether to validate or disprove of the suspicions. The indicated significance of the types of the individual extra-transactional information may convey weights applied to the types of the individual extra-transactional information in determining whether to validate or disprove of the suspicions. The indicated significance of the individual extra-transactional information may convey weights applied to the individual extra-transactional information in determining whether to validate or disprove of the suspicions.

Evaluation component 118 may be configured to evaluate the extra-transactional information by assigning risk scores to the extra-transactional information included in the sources. Evaluation component 118 may be configured to determine the risk scores assigned to the extra-transactional information included in the sources by identifying the extra-transactional information within the sources and/or determining if the identified extra-transactional information is consistent with money laundering. The risk scores may be assigned in accordance with the indicated significance of the types of extra-transactional information, the indicated significance of the extra-transactional information, and/or may be determined in other ways.

In some implementations, determining whether extra-transactional information is consistent with money laundering may be based on one or more of an objective standard, a subjective standard, common practices carried out by persons skilled in the art of investigating AML alerts, a look-up table specifying if the extra-transactional information may be consistent with money laundering and/or a score that should be applied thereto, and/or by other evaluation techniques. Determining whether extra-transactional information is consistent with money laundering may be dependent on the pattern type of a monetary transaction flow pattern indicated in an alert. For example, an entity conducting business may carry out monetary transactions that contribute to the various suspicious monetary transaction flow patterns described herein. In order to determine if business they are conducting includes legitimate and legal transaction or the perpetration of money laundering, looking at extra-transactional information may provide some insight as to whether those transactions are legitimate and legal or illegal money laundering.

For example, if a given source is accessed and particular extra-transactional information is found within that source, the extra-transactional information may be assigned a specific risk score based on the existence of that particular extra-transactional information within the source. By way of non-limiting illustration, for a receiving velocity type monetary transaction flow pattern indicating that a velocity of received moneys has exceeded a threshold, if a credit card information source includes extra-transactional information showing that the transaction history has decreased (e.g., the particular extra-transactional information), then this extra-transactional information may be determined as being indicative of money laundering. Further, if transaction history is specified as the most significant for the credit card information sources, than the transaction history may be assigned a specific risk score that may be relatively higher than other risk scores, and/or a risk score may be weighted relatively higher in the overall evaluation of extra-transactional information from that source and/or from other sources. Conversely, for the receiving velocity type monetary transaction flow pattern indicating that a velocity of received moneys has exceeded a threshold, if a credit card information source includes extra-transactional information showing that the transaction history has also increased, then this extra-transactional information may be determined as not being indicative of money laundering. Instead, this extra-transactional information may disprove the suspicions that increased velocity of received moneys is associated with legitimate business transactions. In this case, if transaction history is specified as the most significant for the credit card information sources, than the transaction history may be assigned a specific risk score that may be relatively lower than other risk scores, and/or a risk score may be weighted relatively lower in the overall evaluation of extra-transactional information from that source and/or from other sources.

While the above examples illustrates just a few ways that extra-transactional information may be determined as being indicative of money laundering for the purpose of assigning a risk score, this is for illustrative purposes only and is not to be considered limiting. For example, it is to be understood that those skilled in the art may recognize other ways in which the extra-transactional information may be evaluated to determine if that information is or is not indicative of money laundering and/or how that evaluation may be used to assign a risk score. By way of further non-limiting illustration, if a social media source indicates that a business entity sending and/or receiving money does not have a listed address, website, phone number, and/or other identification information, this may be indicative of the business entity may be a fraud and used specifically for the concealment of money. A risk score may be assigned to that identification information that may convey relatively more risk than other extra-transactional information (e.g., by assigning it a relatively higher risk score).

In some implementations, a risk score may comprise one or more of quantitative value, a qualitative value, and/or other measure of risk. In some implementations, a risk score may be determined using a lookup table of risk scores selected for particular extra-transactional information and/or source when extra-transactional information within a source may be determined as being consistent with money laundering.

In some implementations, a source may be initially assigned a base risk score. The risk score may be increased in response to the identified extra-transactional information within that source being consistent with money laundering and/or decreased in response to identified extra-transactional information within that source being inconsistent with money laundering. By way of non-limiting illustration, a base risk score of zero ("0") and/or other value may be assigned to individual sources. The base risk score may be increased and/or decreased depending on the finding of extra-transactional information being consistent or inconsistent with money laundering. In some implementations, the increase or decrease may be by a unit (e.g., by a value of "1") and/or other manner of increasing and/or decreasing the score. For example, relatively more risk (e.g., based on significance) may result in an increase or decrease of more than a unit value.

Evaluation component 118 may be configured to evaluate the extra-transactional information by determining individual weighted risk scores and/or other information. The weighted risk scores may a score assigned to individual alerts once extra-transactional information has been evaluated. A weighted risk score may be determined by weighting the individual risk scores determined for sources accessed for a given alert and/or the individual risk scores determine for the extra-transactional information included in the sources. The weighting may be a coefficient. The weighting may be in accordance with the indicated significance of the sources and/or other information. In some implementations, the weighting may be value determined using a lookup table conveying coefficients of weight that correspond to indicated significance (e.g., placement on a rank). By way of non-limiting illustration, sources ranked higher may be weighted by a relative larger coefficient than sources ranked relatively lower.

In some implementations, once risk scores have been assigned to extra-transactional information within a given source, the risk scores may be aggregated to determine an overall risk score for that source. In some implementations, the aggregating of risk scores may be made by addition and/or other aggregation. In some implementations, the aggregation may utilize weights assigned to individual extra-transactional information. Then, the individual overall risk scores for the individual sources included within a source list may be aggregated to determine the weighted risk score for a given alert. The aggregation to determine the weighted risk score may utilize the weights assigned to individual sources based on significance.

The weighted risk scores may convey a likelihood that the suspicions of an alert may or may not be valid. By way of non-limiting illustration, if the weighted risk score for evaluating a monetary transaction flow pattern indicated in a given alert meets and/or exceeds a threshold value, the suspicions of the alert may be validated. This validation may be communicated to an authority and/or other entity so that appropriate further steps may be conducted by the proper authority or entity.

In some implementations, the threshold value(s) of which the weighted risk scores may be evaluated against may be one or more of specific to the pattern type of a given alert, learned over time, and/or preset by an administrator of system 100. In some implementations, the threshold value may be learned by training a machine learning program, such as a neural network and/or other machine learning. For example, a machine learning program may be trained by providing training data comprising inputs and known outputs and/or other information. Cases where alerts have been validated or disproved, for example, based on manual evaluation, may be provided into a neural network to train the neural network to establish threshold values and/or other information. The alert information for those cases may be provided as inputs and extra-transactional information and/or manually determined risk scores establishing the cases as either valid or disproved may be provided as the desired outputs. It is noted that carrying out other features and/or functions of system 100 may be facilitated by machine learning. Different aspects of a machine learning program may be trained according to appropriate training data.

By way of non-limiting illustration, evaluating the extra-transactional information included in the sources of the first source list may include evaluating first extra-transactional information about the first entity included a first source of the first source list. The first source may have a first level of significance. Evaluation component 118 may be configured to evaluate second extra-transactional information about the first entity included in a second source of the first source list. The second source may have a second level of significance. Evaluation component 118 may be configured to determine whether to validate or disprove the suspicions of the first monetary transaction flow pattern based on the evaluations by giving the first extra-transactional information a first weight and the second extra-transactional information a second weight. The first weight may correspond to the first level of significance, and the second weight corresponding to the second level of significance. A first risk score may be assigned to the first extra-transactional information and a second risk score is assigned to the second extra-transactional information. A first weighted risk score may be determined for the first monetary transaction flow pattern based on weighting the first risk score by the first weight and the second risk score by the second weight. The validation or disproval of the suspicions of the first monetary transaction flow pattern may be based on the first weighted risk score.

In some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute modules 110, 112, 114, 116, 118, and/or other modules. Processor(s) 130 may be configured to execute modules 110, 112, 114, 116, 118, and/or other modules by software; hardware; firmware; some combination of software, hardware, and/or firmware; and/or other mechanisms for configuring processing capabilities on processor(s) 130. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 110, 112, 114, 116, and 118 are illustrated in FIG. 1 as being implemented within a single processing unit, in implementations in which processor(s) 130 includes multiple processing units, one or more of modules 110, 112, 114, 116, and/or 118 may be implemented remotely from the other modules. The description of the functionality provided by the different modules 110, 112, 114, 116, and/or 118 described below is for illustrative purposes, and is not intended to be limiting, as any of modules 110, 112, 114, 116, and/or 118 may provide more or less functionality than is described. For example, one or more of modules 110, 112, 114, 116, and/or 118 may be eliminated, and some or all of its functionality may be provided by other ones of modules 110, 112, 114, 116, and/or 118. As another example, processor(s) 130 may be configured to execute one or more additional modules that may perform some or all of the functionality attributed below to one of modules 110, 112, 114, 116, and/or 118.

Figure 2:
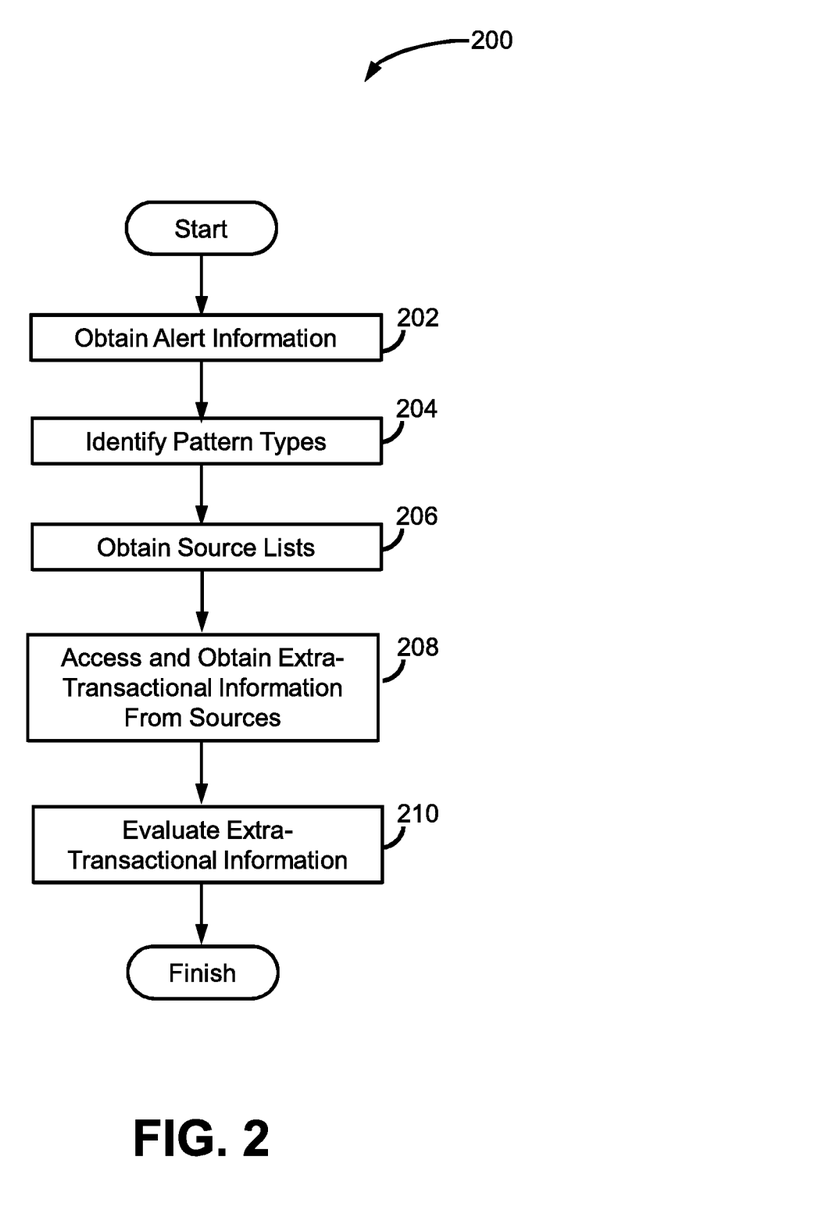
FIG. 2 illustrates a method to facilitate automated validation of anti-money laundering alerts, in accordance with one or more implementations

FIG. 2 illustrates a method 200 to facilitate automated validation of anti-money laundering alerts, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include obtaining alert information and/or other information. The alert information may include one or more of alerts indicating monetary transaction flow patterns suspected as money laundering, indications of entities involved in monetary transactions that contribute to the monetary transaction flow patterns, and/or other information. By way of non-limiting illustration, alert information may be obtain including a first alert indicating a first monetary transaction flow pattern suspected as money laundering, a first entity involved in one or more monetary transactions that contribute to the first monetary transaction flow pattern, and/or other information. Operation 202 may be performed by one or more hardware processors configured by machine-readable instructions including a component that is the same as or similar to alert component 110, in accordance with one or more implementations.

An operation 204 may include identifying pattern types of the monetary transaction flow patterns, including identifying a first pattern type of the first monetary transaction flow pattern. Operation 204 may be performed by one or more hardware processors configured by machine-readable instructions including a component that is the same as or similar to pattern type component 112, in accordance with one or more implementations.

An operation 206 may include obtaining source lists indicating sources of extra-transactional information. An individual source list may be specific to an individual pattern type. The extra-transactional information may include information about the entities involved in the monetary transactions. An individual source list may further indicate significance of the individual sources included in the individual source list. A first source list may be obtained responsive to identifying the first pattern type. The first source list may be specific to the first pattern type. Operation 206 may be performed by one or more hardware processors configured by machine-readable instructions including a module that is the same as or similar to source list component 114, in accordance with one or more implementations.

An operation 208 may include accessing the sources and obtaining the extra-transactional information in the sources that may be related to the one or more entities involved in the monetary transactions. By way of non-limiting illustration, responsive to obtaining the first source list, sources of the first source list may be accessed to obtain extra-transactional information about the first entity. Operation 208 may be performed by one or more hardware processors configured by machine-readable instructions including a component that is the same as or similar to source accessing component 116, in accordance with one or more implementations.

An operation 210 may include evaluating the extra-transactional information included in the sources in accordance with the indicated significance of the sources to validate or disprove the suspicions of the monetary transaction flow patterns indicated in the alerts. The indicated significance of the sources may convey weights applied to the sources in determining whether to validate or disprove of the suspicions. By way of non-limiting illustration, evaluating the extra-transactional information included in the sources of the first source list may include evaluating first extra-transactional information about the first entity included a first source of the first source list. The first source may have a first level of significance. Evaluating the extra-transactional information included in the sources of the first source list may include evaluating second extra-transactional information about the first entity included in a second source of the first source list. The second source may have a second level of significance. Determining whether to validate or disprove the suspicions of the first monetary transaction flow pattern may be based on the evaluations by giving the first extra-transactional information a first weight and the second extra-transactional information a second weight. The first weight may correspond to the first level of significance. The second weight may correspond to the second level of significance. Operation 210 may be performed by one or more hardware processors configured by machine-readable instructions including a component that is the same as or similar to evaluation component 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate automated validation of anti-money laundering alerts, the system comprising:
   one or more hardware processors configured by machine-readable instructions to:
   obtain, by an alert component, alert information, the alert information including alerts indicating monetary transaction flow patterns suspected as money laundering and entities involved in monetary transactions that contribute to the monetary transaction flow patterns, the alert information including a first alert, the first alert indicating a first monetary transaction flow pattern suspected as money laundering and a first entity involved in one or more monetary transactions that contribute to the first monetary transaction flow pattern;
   identify, by a pattern type component, pattern types of the monetary transaction flow patterns, including identifying a first pattern type of the first monetary transaction flow pattern;
   obtain, by a source list component, source lists indicating sources of extra-transactional information, an individual source list being specific to an individual pattern type, the extra-transactional information including information about the entities involved in the monetary transactions, wherein an individual source list further indicates significance of the individual sources included in the individual source list with regard to validating or disproving suspicions of the monetary transaction flow patterns indicated in the alerts, such that a first source list is obtained responsive to identifying the first pattern type, the first source list being specific to the first pattern type;
   access, by a source accessing component, the sources and obtaining the extra-transactional information in the sources that is related to the entities involved in the monetary transactions, such that responsive to obtaining the first source list, sources of the first source list are accessed to obtain extra-transactional information about the first entity; and
   evaluate, by an evaluation component, the extra-transactional information included in the sources in accordance with the indicated significance of the sources to validate or disprove the suspicions of the monetary transaction flow patterns indicated in the alerts, the indicated significance of the sources conveying weights applied to the sources in determining whether to validate or disprove the suspicions, such that evaluating the extra-transactional information included in the sources of the first source list comprises:
     (i) evaluating first extra-transactional information about the first entity included in a first source of the first source list by assigning a first risk score, the first source having a first level of significance, such that a first weight is applied to the first risk score in accordance with the first level of significance;
     (ii) evaluating second extra-transactional information about the first entity included in a second source of the first source list by assigning a second risk score, the second source having a second level of significance, such that a second weight is applied to the second risk score in accordance with the second level of significance;

(iii) aggregating the first risk score weighted by the first weight with the second risk score weighted by the second weight, into an aggregated risk score; and (iv) determining whether to validate or disprove the suspicions of the first monetary transaction flow pattern based on the aggregated risk score exceeding a risk threshold.

2. The system of claim 1, wherein the one or more hardware processors are further configured by machine-readable instructions to:
determine, by the evaluation component, the risk scores assigned to the extra-transactional information included in the sources by identifying the extra-transactional information within the sources, and determining if the identified extra-transactional information is consistent with money laundering.

3. The system of claim 2, wherein the risk score is increased in response to the identified extra-transactional information being consistent with money laundering and decreased in response to the identified extra-transactional information being inconsistent with money laundering.

4. The system of claim 1, wherein the individual source list further indicates, for individual sources in the individual source list, significance of types of extra-transactional information included in the individual sources, and wherein evaluating the extra-transactional information included in the sources is further in accordance with the indicated significance of the types of the individual extra-transactional information included in the individual sources, the indicated significance of the types of the individual extra-transactional information conveying weights applied to the types of the individual extra-transactional information in determining whether to validate or disprove of the suspicions.

5. The system of claim 4, wherein the sources include one or more of social media sources, customer due diligence sources, employment information sources, credit card information sources, velocity of funds reports sources, or earnings and sales reports sources.

6. The system of claim 5, wherein types of the extra-transactional information in the social media sources include crowd-sourced review information, engagement information, and identification information.

7. The system of claim 5, wherein types of the extra-transactional information in the customer due diligence sources include beneficiary information, point-of-origin information, driver's license information, and criminal background information.

8. The system of claim 5, wherein types of the extra-transactional information in the employment information sources include salary information, current employer information, length of current employment information, past employer information, and length of past employment information.

9. The system of claim 5, wherein a type of the extra-transactional information in the credit card information sources includes transaction history information.

10. The system of claim 5, wherein a type of the extra-transactional information in the velocity of funds reports sources includes velocity of funds information, wherein the velocity of funds information includes a velocity of funds report.

11. The system of claim 5, wherein a type of the extra-transactional information in the earnings and sales reports sources includes earnings and sales information, wherein the earning and sales information includes an earnings and sales report.

12. A method to facilitate automated validation of anti-money laundering alerts, the method being implemented in a computer system including one or more hardware processors, the method comprising:
obtaining, by the one or more hardware processors, alert information, the alert information including alerts indicating monetary transaction flow patterns suspected as money laundering and entities involved in monetary transactions that contribute to the monetary transaction flow patterns, including obtaining alert information including a first alert indicating a first monetary transaction flow pattern suspected as money laundering and a first entity involved in one or more monetary transactions that contribute to the first monetary transaction flow pattern;
identifying, by the one or more hardware processors, pattern types of the monetary transaction flow patterns, including identifying a first pattern type of the first monetary transaction flow pattern;
obtaining, by the one or more hardware processors, source lists indicating sources of extra-transactional information, an individual source list being specific to an individual pattern type, the extra-transactional information including information about the entities involved in the monetary transactions, wherein an individual source list further indicates significance of the individual sources included in the individual source list, a first source list being obtained responsive to identifying the first pattern type, the first source list being specific to the first pattern type;
accessing, by the one or more hardware processors, the sources and obtaining the extra-transactional information in the sources that is related to the entities involved in the monetary transactions, such that responsive to obtaining the first source list, sources of the first source list are accessed to obtain extra-transactional information about the first entity; and
evaluating, by the one or more hardware processors, the extra-transactional information included in the sources in accordance with the indicated significance of the sources to validate or disprove the suspicions of the monetary transaction flow patterns indicated in the alerts, the indicated significance of the sources conveying weights applied to the sources in determining whether to validate or disprove of the suspicions, such that evaluating the extra-transactional information included in the sources of the first source list comprises:
evaluating first extra-transactional information about the first entity included a first source of the first source list, the first source having a first level of significance;
evaluating second extra-transactional information about the first entity included in a second source of the first source list, the second source having a second level of significance; and
determining whether to validate or disprove the suspicions of the first monetary transaction flow pattern based on the evaluations by giving the first extra-transactional information a first weight and the second extra-transactional information a second weight, the first weight corresponding to the first level of significance, and the second weight corresponding to the second level of significance.

13. The method of claim 12, further comprising:
determining, by the one or more hardware processors, the risk scores assigned to the extra-transactional information included in the sources by identifying the extra-transactional information within the sources, and determining if the identified extra-transactional information is consistent with money laundering.

14. The method of claim 13, wherein the risk score is increased in response to the identified extra-transactional information being consistent with money laundering and decreased in response to the identified extra-transactional information being inconsistent with money laundering.

15. The method of claim 12, wherein the individual source list further indicates, for individual sources in the individual source list, significance of types of extra-transactional information included in the individual sources, and wherein evaluating the extra-transactional information included in the sources is further in accordance with the indicated significance of the types of the individual extra-transactional information included in the individual sources, the indicated significance of the types of the individual extra-transactional information conveying weights applied to the types of the individual extra-transactional information in determining whether to validate or disprove of the suspicions.

16. The method of claim 15, wherein the sources include one or more of social media sources, customer due diligence sources, employment information sources, credit card information sources, velocity of funds reports sources, or earnings and sales reports sources.

17. The method of claim 16, wherein types of the extra-transactional information in the social media sources include crowd-sourced review information, engagement information, and identification information.

18. The method of claim 16, wherein types of the extra-transactional information in the customer due diligence sources include beneficiary information, point-of-origin information, driver's license information, and criminal background information.

19. The method of claim 16, wherein types of the extra-transactional information in the employment information sources include one or more of salary information, current employer information, length of current employment information, past employer information, and length of past employment information.

20. The method of claim 16, wherein a type of the extra-transactional information in the credit card information sources includes transaction history information.

21. The method of claim 16, wherein a type of the extra-transactional information in the velocity of funds reports sources includes velocity of funds information, wherein the velocity of funds information includes a velocity of funds report.

22. The method of claim 16, wherein a type of the extra-transactional information in the earnings and sales reports sources includes earnings and sales information, wherein the earning and sales information includes an earnings and sales report.

* * * * *